(12) United States Patent
Taylor

(10) Patent No.: US 7,085,288 B2
(45) Date of Patent: Aug. 1, 2006

(54) CONTENT DELIVERY OPTIMIZER FOR A COMMUNICATIONS SYSTEM

(75) Inventor: Scott P. Taylor, Renton, WA (US)

(73) Assignee: The Boeing Company, Chicago, IL (US)

( * ) Notice: Subject to any disclaimer, the term of this patent is extended or adjusted under 35 U.S.C. 154(b) by 769 days.

(21) Appl. No.: 09/947,972

(22) Filed: Sep. 6, 2001

(65) Prior Publication Data
US 2003/0043760 A1    Mar. 6, 2003

(51) Int. Cl.
*H04L 12/28* (2006.01)
*H04L 3/16* (2006.01)

(52) U.S. Cl. .................. 370/468; 370/412; 370/395.4; 370/395.2

(58) Field of Classification Search ................ 370/468, 370/331, 412, 235, 328, 395.21, 395.4, 389, 370/392
See application file for complete search history.

(56) References Cited

U.S. PATENT DOCUMENTS

| | | | |
|---|---|---|---|
| 5,937,328 A | | 8/1999 | Park et al. |
| 5,943,324 A | | 8/1999 | Ramesh et al. |
| 6,118,834 A | * | 9/2000 | Rasanen ...................... 375/372 |
| 6,240,094 B1 | * | 5/2001 | Schneider .................... 370/412 |
| 6,298,073 B1 | | 10/2001 | LeFever |
| 6,377,561 B1 | * | 4/2002 | Black et al. ................. 370/330 |
| 6,731,613 B1 | * | 5/2004 | Provance .................... 370/311 |
| 6,738,363 B1 | * | 5/2004 | Best et al. ................... 370/329 |
| 6,778,809 B1 | * | 8/2004 | Morimoto ................... 455/11.1 |

FOREIGN PATENT DOCUMENTS

WO    WO 00/14987    3/2000

* cited by examiner

*Primary Examiner*—Hanh Nguyen
(74) *Attorney, Agent, or Firm*—Harness Dickey & Pierce P.L.C.

(57) ABSTRACT

A communication system for supplying information content from a base station to a mobile platform via a satellite link, wherein the base station monitors a plurality of buffers used to supply the content to insure that all of the buffers are utilized in the most efficient manner possible. If it is detected that any one or more of the buffers are being under utilized, meaning that one or more has additional capacity, then the base station will select a transmission method for the information content to be transmitted, for example, a point-to-point connection which requires additional formatting of the information content. This requires additional buffer capacity but will better ensure that the requested information content will be reliably received by the requesting mobile platform.

13 Claims, 3 Drawing Sheets

CONTENT DELIVERY OPTIMIZER FOR A COMMUNICATIONS SYSTEM

FIELD OF THE INVENTION

The present invention relates to systems and methods for supplying data, web content, software updates, and information to a mobile platform, such as an aircraft, from a base station, and more particularly to a system and method for determining the most efficient method for delivering data, information, etc. to a mobile platform in a manner which maximizes the utilization of the allocated spectrum of each satellite transponder of the system.

BACKGROUND OF THE INVENTION

In a communication system in which various forms of data and/or information need to be supplied to a plurality of mobile platforms, in real time, it is important that the system supplying such information content is utilized in a manner to most efficiently transmit the information to each one of the mobile platforms. More specifically, it is important that information content being supplied over different transponder channels, wherein each transponder channel is optimized for a specific transport (i.e., either broadcast, multicast or unicast), is supplied by the base station using the transponder channel such that the spectrum associated with each transponder channel is utilized most efficiently. By controlling and monitoring the types of transmission schemes used to transmit information content to each and every mobile platform in communication with the base station, this would ensure the most efficient utilization of each transponder spectrum. Efficient utilization of each transponder spectrum becomes of paramount importance if the base station is trying to deliver information content to a large number of mobile platforms, such as dozens, hundreds or even thousands of mobile platforms, operating in a given coverage region simultaneously, and where different types of data, information, etc. need to be delivered to each of the mobile platforms currently being serviced, some subset of those platforms currently being serviced, or just one. Under such circumstances, some means and/or method would be highly desirable to employ for monitoring the utilization of each of the buffers or satellite links associated with the base station such that information content being handled by a particular buffer or link having additional capacity can be transmitted to the mobile platform, requiring the specific content, using the transmission method which best ensures that the information is transmitted using the most expeditious or reliable method. For example, the consideration of which system to use to most expeditiously transmit information may involve considering whether to use broadcasting or multicasting over the spectrum allocated for broadcast or multicast. Reliability concerns may dictate that point-to-point or unicast (in networking terms a "reliable transport", such as TCP) connections be employed over the spectrum allocated for reliable transport.

Such a system described above would allow the efficiency of the system to be increased by transmitting the stored information content in the most reliable manner (for example, point-to-point connection vs. a multicast or broadcast transmission). Such a system would monitor the throughout or buffering of the various satellite transponders allocated to the various delivery methodologies (point-to-point connection vs. a multicast transmission). Such a monitoring, delivery system and/or method would also ensure that each satellite transponder channel is used most efficiently because those links having additional capacity are optimized against the content, data, information, etc. that needs to be delivered in relation to the spectrum available and the various mobile platforms requiring it.

Accordingly, it is a principal object of the present invention to provide a system and method for optimizing the delivery of information from one or more buffers or links associated with a satellite transponder of a base station supplying the information content to one or more mobile platforms requiring the information. More particularly, it is an object of the present invention to monitor operation of the transponder channels in a manner that allows the base station or delivery system to use a transmission means for supplying information content to a mobile platform in a manner which most efficiently utilizes each of the transponders.

SUMMARY OF THE INVENTION

The above and other objects are provided by a content delivery optimizer system and method for optimizing the delivery of information content from the base station to the various mobile platforms requiring the various data, information, etc. over multiple satellite transponders. The system and method, in one preferred form, employs a base station having a router which includes a plurality of buffers or ports each associated with a transponder channel optimized for a specific transport (broadcast, multicast or unicast) within a satellite coverage area (i.e., all mobile platforms in active service can receive data from the various satellite transponders). Stored information content required to be delivered to the mobile platform or, more typically, to a plurality of mobile platforms or subset of the platforms currently being serviced, is delivered in the most efficient manner.

The mechanism and algorithm of the present invention analyzes what content, data, information, etc. (i.e. size, Quality of Service (QoS), i.e., guaranteed delivery or best effort, priority of the data, urgency of the data, which mobile platforms require what data or set of data, etc.) needs to be delivered to what set or subset of mobile platforms that are currently being serviced. This is accomplished by using the delivery mechanisms or throughput monitors associated with the various transponders and by monitoring the utilization of each transponder to most efficiently and/or reliably get the content, data, information, etc. to the mobile platform.

In the preferred embodiment, a component of the base station monitors the utilization of each buffer or channel associated with the various transponder allocations. This information is compared against what mobile platforms are currently in service and what data they require. If any one or more of the channels is detected to have available capacity, an analysis of the information, data, content, required software updates, etc. is done and, based on the mobile platforms requiring data, the most efficient transmission mechanism is used.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
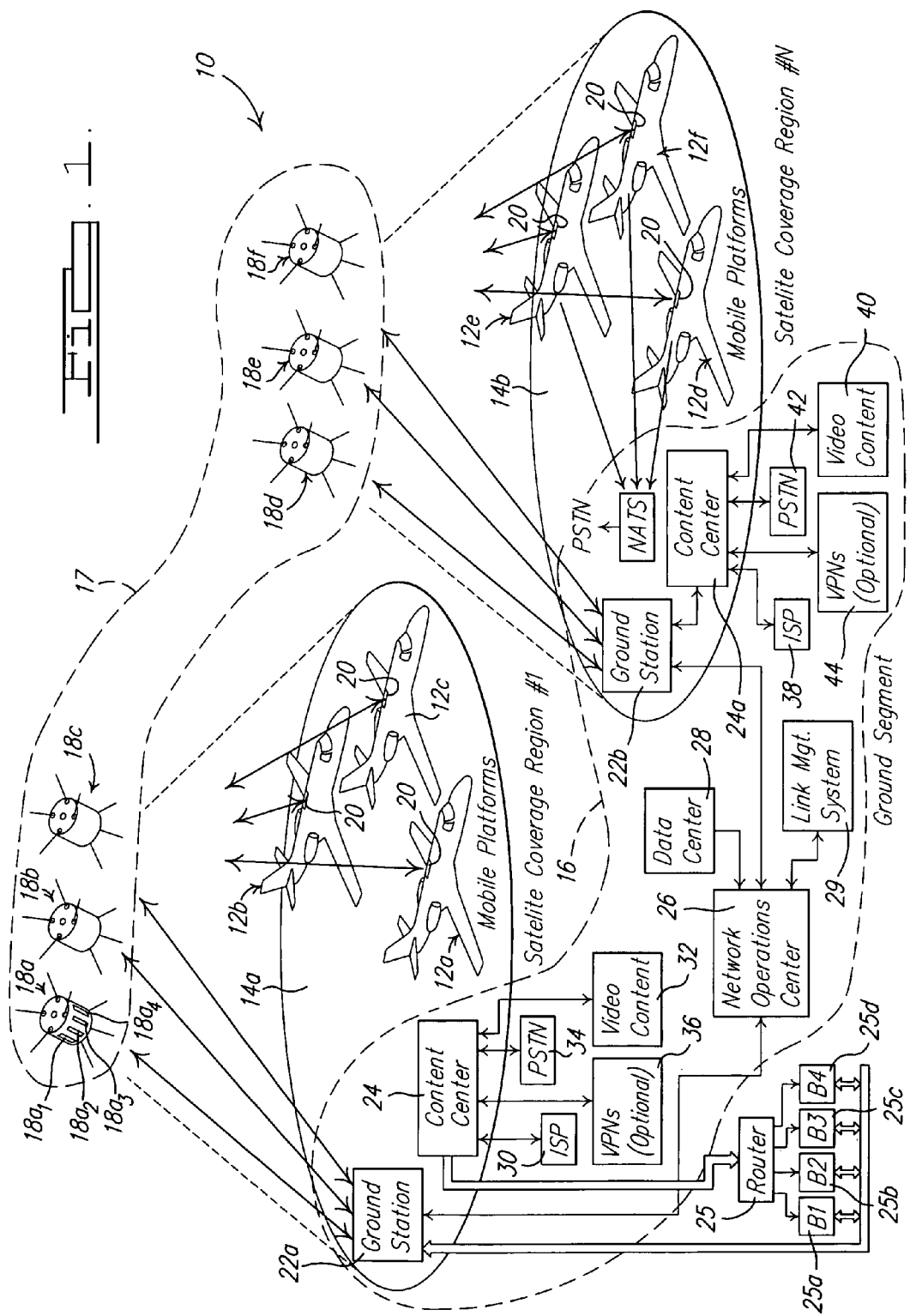
FIG. 1 is a block diagram view of a system in accordance with a preferred embodiment of the present invention.

Referring to FIG. 1, there is shown a system 10 in accordance with a preferred embodiment of the present invention for providing data content to and from a plurality of moving platforms 12a–12f in one or more distinct coverage regions 14a and 14b. The system 10 generally comprises a ground segment 16, a plurality of satellites 18a–18f forming a space segment 17, and a mobile system 20 disposed on each moving platform 12. The moving platforms could comprise aircraft, cruise ships or any other moving vehicle. Thus, the illustration of the moving platforms 12 as aircraft in the figures herein, and the reference to the mobile platforms as aircraft throughout the following description should not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 are further located in a geostationary orbit (GSO) or a non-geostationary orbit (NGSO). Examples of possible NGSO orbits that could be used with this invention include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$–$18a_4$. It will be appreciated that each other satellite 18 illustrated could have a greater or lesser plurality of RF transponders as required to handle the anticipated number of mobile platforms 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$–$18a_4$ further include wide geographic coverage, high effective isotropic radiated power (EIRP) and high gain/noise temperature (G/T).

With further reference to FIG. 1, the ground segment 16 includes a ground station 22 in bidirectional communication with a content center 24 and a network operations center (NOC) 26. The NOC 26 is in communication with a data center 28 and a link management system 29. The data center 28 includes scheduling software for creating a database of the different types of data content that will be provided to each of the aircraft 12, at what time, as well as information indicative of the level of "quality of service" that is to be applied to the data content transmitted to each aircraft 12. In this regard it will be appreciated that the term "data content" is used generically to represent any data or digital information to be transmitted to any of the aircraft 12.

The quality of service information comprises a designation indicative of the importance placed on the data content to be transmitted to a given aircraft 12. The importance is determined by the operator of the mobile platform, which in this example would be an airline company. The airline company may determine that Internet data should be transmitted with a higher level of quality of service than, for example, movies or television programming being supplied to the aircraft 12. The higher the level of quality of service indicated for a given aircraft 12, the greater the effort that will be made in delivering the data content to that aircraft. For example, a high level of quality of service may require the ground system 16 to establish a TCIP connection (i.e., a point-to-point connection) to repeatedly attempt to transmit data content to a given aircraft 12 until the aircraft acknowledges that the data content has been properly received. A lower level of quality of service might require the ground system 16 to attempt to multicast the data content at periodic intervals, if the initial transmission of the data content was not received by the designated aircraft 12.

The data center 28 will also receive information from the operator of each aircraft 12 of an identifying code or number for each aircraft. With commercial aircraft, this code is preferably the tail number of the aircraft. However, it will be appreciated that virtually any form of code which uniquely identifies the mobile platform could be used. The tail number is maintained in the database managed by the data center 28 such that the database includes a listing of the tail number (or other identifying information) of each aircraft 12 that potentially could access the system 10, as well as the specific type of data content designated for each particular aircraft 12 and the level of quality of service to be provided to each particular aircraft. This information could be provided by the operator (e.g., airline company) of each mobile platform via a website in communication with the data center 28 where the operator could specify which aircraft is to receive what type of data content, and at what level of quality of service.

The link management system 29 is used to maintain a database of which aircraft 12 have signed on to the system 10 and are available to receive data content. The link management system 29 also tracks when aircraft 12 have signed off from the system 10 or are leaving the coverage region.

The content center 24 is also in communication with a router 25 having a plurality of buffers 25a–25d The output of each of the buffers 25a–25d is provided to the ground station 22 for transmission to one or more of the satellites 18. The NOC 26 is also in communication with the router 25 to monitor the utilization of each of the buffers 25a–25d. Information content is received by the router 25 from the content center 24 and the router 25 is instructed by the NOC 26 as to which buffer 25a–25d the information is to be temporarily stored in prior to being forwarded to the ground station 22.

While a plurality of four buffers 25a–25d has been shown, it will be appreciated that a greater or lesser plurality of buffers could be incorporated to meet the demands of a specific implementation of the system 10.

It is a principal advantage of the present invention that the NOC 26 monitors the utilization (i.e., available additional capacity) of each of the buffers 25a–25d, in real time, as information content is continuously being requested by the aircraft 12 via the satellite(s) 18. In this manner, the NOC 26 can determine the most effective means for transmitting information content from any of the buffers 25a–25d to a given mobile platform requesting such information based on the available additional capacity of the given buffer 25, and in a manner which utilizes the spectrum of each transponder band width most efficiently. This feature will be described in greater detail in connection with the discussion of FIG. 3.

With further reference to FIG. 1, a second ground station 22a located in the second coverage area 14b may be used if more than one distinct coverage area is required for the service. In this instance, ground station 22a would also be in bidirectional communication with the NOC 26 via a terrestrial ground link or any other suitable means for establishing a communication link with the NOC 26. The ground station 22a would also be in bidirectional communication with a content center 24a. For the purpose of discussion, the system 10 will be described with respect to the operations occurring in coverage region 14a. However, it will be understood that identical operations relative to the satellites 18d–18f occur in coverage region 14b. It will also be understood that the invention may be scaled to any number of coverage regions 14 in the manner just described.

The ground station 22 comprises an antenna and associated antenna control electronics needed for transmitting data content to the satellites 18a and 18b. The antenna of the ground station 22 may also be used to receive data content transponded by the transponders $18a_1$–$18a_4$ originating from each mobile system 20 of each aircraft 12 within the coverage region 14a. The ground station 22 may be located anywhere within the coverage region 14a. Similarly, ground station 22a, if incorporated, can be located anywhere within the second coverage area 14b.

The content center 24 is in communication with a variety of external data content providers and controls the transmission of video and data information received by it to the ground station 22. Preferably, the content center 24 is in contact with an Internet service provider (ISP) 30, a video content source 32 and a public switched telephone network (PSTN) 34. Optionally, the content center 24 can also communicate with one or more virtual private networks (VPNs) 36. The ISP 30 provides Internet access to each of the occupants of each aircraft 12. The video content source 32 provides live television programming, for example, Cable News Network® (CNN) and ESPN®. The NOC 26 performs traditional network management, user authentication, accounting, customer service and billing tasks. The content center 24a associated with the ground station 22a in the second coverage region 14b would also preferably be in communication with an ISP 38, a video content provider 40, a PSTN 42, and optionally a VPN 44.

Figure 2:
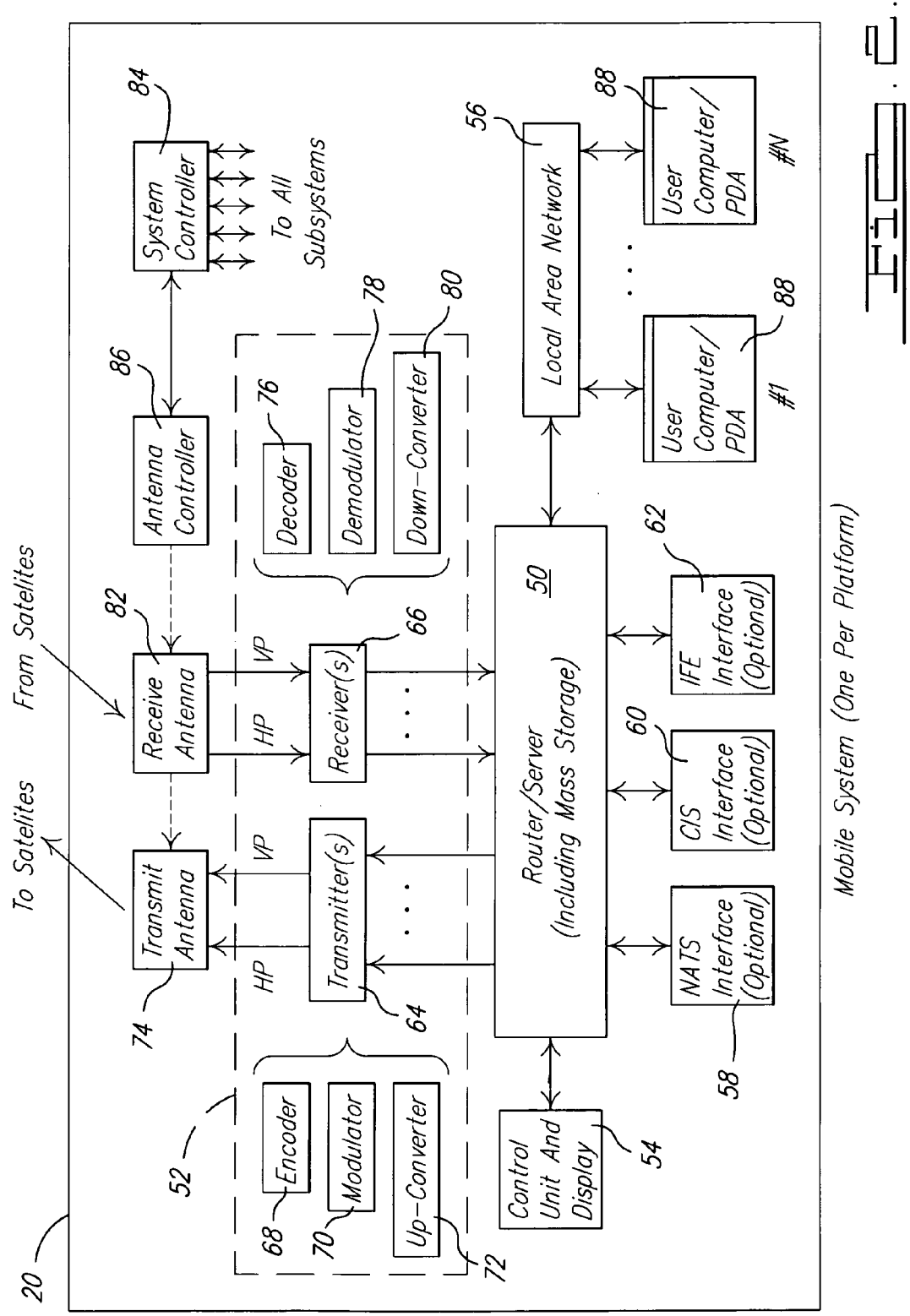
FIG. 2 is a detailed block diagram of the mobile terminal carried by each mobile platform.

Referring now to FIG. 2, the mobile system 20 disposed on each aircraft 12 will be described in greater detail. Each mobile system 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an Up-converter 72 for encoding, modulating and up-converting data content signals from the server 50 to a transmit antenna 74. The receiver subsystem 66 includes a decoder 76, a demodulator 78 and a down-converter 80 for decoding, demodulating and down-converting signals received by the receive antenna 82 into baseband video and audio signals, as well as data signals. While only one receiver subsystem 66 is shown, it will be appreciated that preferably a plurality of receiver subsystems 66 will typically be included to enable simultaneous reception of RF signals from a plurality of RF transponders. At present, it is anticipated that a plurality of independent receiver subsystems 66 will form the most effective means for each aircraft 12 to receive information content from one or more of the satellites 18. If a plurality of receiver subsystems 66 are shown, then a corresponding plurality of components 76–80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12a. Each access station 88 can be used to interface the server 50 directly with a user's laptop computer, personal digital assistant (PDA) or other personal computing device of the user. The access stations 88 could also each comprise a seat back mounted computer/display. The LAN 56 enables bidirectional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the present invention is disclosed in U.S. Pat. No. 5,886,671, assigned to The Boeing Co., and hereby incorporated by reference.

Referring further to FIG. 1, in operation of the system 10, the data content is preferably formatted into Internet protocol (IP) packets before being transmitted by either the ground station 22, or from the transmit antenna 74 of each mobile system 20. For the purpose of discussion, a transmission of data content in the form of IP packets from the ground station 22 will be referred to as a "forward link" transmission. IP packet multiplexing is also preferably employed such that data content can be provided simultaneously to each of the aircraft 12 operating within the coverage region 14a using unicast, multicast and broadcast transmissions.

The IP data content packets received by each of the transponders $18a_1$–$18a_4$ are then transponded by the transponders to each aircraft 12 operating within the coverage region 14a. While multiple satellites 18 are illustrated over coverage region 14a, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 12. The receive antenna 74 of each aircraft receives the entire RF transmission of encoded RF signals representing the IP data content packets from at least one of the transponders $18a_1$–$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$–$18a_4$ carried by the target satellite 18 to which it is pointed. The receiver 66 decodes, demodulates and down-converts the encoded RF signals to produce video and audio signals, as well as data signals, that are input to the server 50. The server operates to filter off and discard any data content not intended for users on the aircraft 12 and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12a.

An advantage of the present invention is that the system 10 is also capable of receiving DBS transmissions of live television programming (e.g., news, sports, weather, entertainment, etc.). Examples of DBS service providers include DirecTV® and Echostar®. DBS transmissions occur in a frequency band designated for broadcast satellite services (BSS) and are typically circularly polarized in North America. Therefore, a linear polarization converter may be optionally added to receive antenna 82 for receiving broadcast satellite services in North America. The FSS frequency band that carries the data services and the BSS frequency band that carries DBS transmissions are adjacent to each other in the Ku-band. In one optional embodiment of the system 10, a single Ku-band receive antenna can be used to receive either DBS transmissions from DBS satellites 18c and 18f in the BSS band or data services in the FSS band from one of the FSS satellites 18a or 18b, or both simultaneously using the same receive antenna 82. Simultaneous reception from multiple satellites 18 is accomplished using a multi-beam receive antenna 82 or by using a single beam receive antenna 82 with satellites co-located in the same geostationary orbit slot.

Rebroadcast television or customized video services are received and processed by the mobile system 20 in exactly the same way. Rebroadcast or customized video content is obtained from the video content source 32 and transmitted via the ground station 22 to the FSS satellites 18a and 18b. The video content is appropriately encoded for transmission by the content center 24 before being broadcast by the ground station 22. Some customization of the rebroadcast content may occur on the server 50 (FIG. 2) of the mobile system 20 to tailor advertisements and other information content to a particular market or interest of the users on the aircraft 12.

The bulk of data content provided to the users on each aircraft 12 is provided by using a private portal data content. This is implemented as a set of HTML pages housed on the server 50 of each mobile system 20. The content is kept fresh by periodically sending updated portions from a ground-based server located in content center 24, and in accordance with a scheduling function controlled by the NOC 26 of the ground segment 16. The server 50 can readily be configured to accept user log-on information to support authentication and authorization of users and to keep track of user and network accounting information to support a billing system. The authorization and accounting systems can be configured to communicate with the ground segment 16 to transfer accumulated data at convenient intervals to the NOC 26.

The system 10 of the present invention also provides direct Internet connectivity via satellite links for a variety of purposes, such as when a user on board the aircraft 12 desires to obtain data content that is not cached on server 50, or as an avenue for content sources to provide fresh content for the private portals. The server may be used to cache the most frequently requested web pages as well as to host a domain name system (DMS) look-up table of the most frequently accessed domains. The DMS look-up table is preferably maintained by the content center 24 and is periodically updated on the mobile system 20. Refreshing of the cached content of the portal may be accomplished by in-flight, periodic "pushed" cache refresh or at the gate of an airport terminal using any form of wired or wireless connection to the aircraft 12, or via a manual cache refresh by a crew member of the aircraft 12 carrying on board a CD ROM and inserting it into the cache server.

Figure 3:
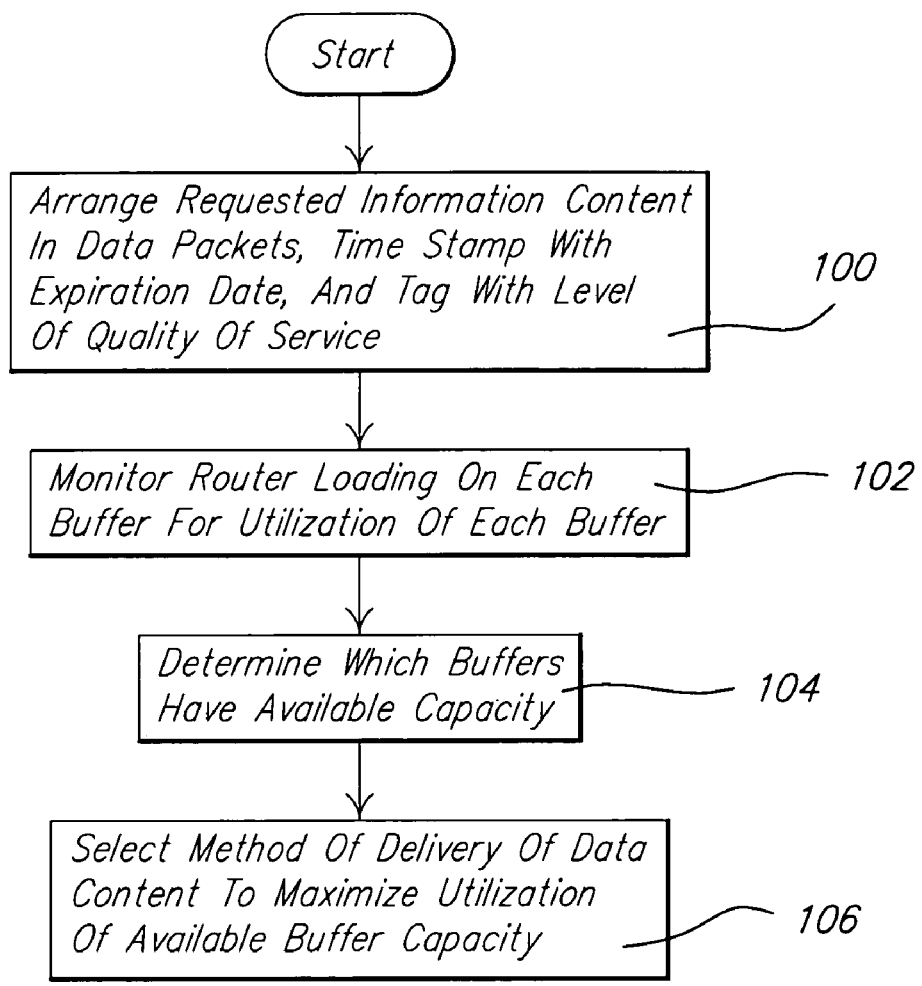
FIG. 3 is a flow chart illustrating the steps performed by the system and method of the present invention in optimizing the use of the buffers of the base station such that information content can be transmitted to the mobile platforms using the most effective transmission scheme.

Referring now to FIG. 3, a flowchart setting forth the steps performed by the system and method of the present invention is shown. Initially, information content requested by each aircraft 12 is arranged in data packets and time stamped, provided with an expiration date, and tagged with a level of quality of service, as indicated at step 100. Next, the NOC 26 monitors the loading of each buffer 25a–25d associated with the router 25 by continuously monitoring the outputs of the router 25 to determine the utilization of each buffer, as indicated at step 102. The NOC 26 then determines if any of the buffers 25a–25b have available capacity, as indicated at step 104. If any of the buffers 25a–25b have available capacity, then the NOC 26 will select the method of providing the information content which best assures that the entire quantity of information content transmitted by the ground station 22 will be received by the requesting aircraft 12. Thus, the NOC 26 determines if a given buffer 25a–25d has available capacity, based on the type of information content requested and the level of service being requested. If a given buffer 25a–25d has available capacity, thus indicating that it is being underutilized, the NOC 26 may select to establish a point-to-point connection with the requesting aircraft 12, which form of connection would require additional formatting and thus additional utilization of that particular buffer and its associated transponder $18a_1$–$18a_4$ spectrum. However, this method of transmission scheme would provide a greater assurance that the entire quantity of information content requested by the aircraft 12 will be received. If no additional capacity in any given buffer 25 is available, then the NOC 26 may choose to simply multicast the information content from each of the buffers. This form of transmission would not require any extensive formatting, and therefore no additional buffer capacity, and thus no additional transponder band width, to implement.

As an example, if there is only one mobile platform currently active (requiring service), most likely all content, data, information, software updates, etc. will be provided using the spectrum allocated for highly reliable unicast transmission. In networking terms, this would mean using TCP with its three handshakes and associated overhead to establish a connection because there is ample spectrum available, because the overhead would be negligible, and because the type of connection guarantees delivery of the data. As more mobile platforms come into service, and the reliable unicast spectrum becomes more heavily utilized, the broadcast or multicast spectrum (depending on the level of quality of service requirements of data) becomes a more economical means to deliver data or content to a large number of mobile platform simultaneously. Due to its efficiency in delivery (i.e., sending data once, and mobile platform receiving it), it doesn't require any handshaking or overhead to send data, but this methodology provides no guarantee of delivery. As mobile platforms require less service, such as during meal breaks or later on in the evening, the spectrum can be optimized to service those mobile platforms requiring more service.

At step 106, based on the utilization of each buffer 25a–25d, the NOC 26 selects the method of delivery of data content from each buffer to maximize the utilization of each buffer.

From the foregoing, it will be appreciated that the method and apparatus of the present invention ensures that the buffers of a router supplying requested information content to a plurality of mobile platforms are managed so as to maximize the utilization of each buffer. In this manner, information content can be supplied to the aircraft requesting same using a transmission protocol which best ensures that the entirety of the requested information content will be received by the requesting aircraft.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A communication system for maximizing an efficiency of the delivery of information content to a mobile platform from a base station, via a space-based component, and wherein said base station is in communication with a content source, said system comprising:

a router comprising a plurality of buffers for temporarily storing packets of said information content to be transmitted to said mobile platform, each of said packets being identified by an identifier which indicates which one of said mobile platforms it is directed to; and a system for monitoring each of said buffers and for selecting a transmission scheme, when any one of said buffers has available capacity, that increases the utilization of said buffers and increases the probability that all of said information content will be received by said mobile platform requesting same, said information content to be received by said mobile platform being determined by an input applied remotely to said mobile platform, said input communicated through said content source and including a specific type of data content and a level of quality of service.

2. The system of claim 1, said packets of said information content being time stamped prior to being supplied to said buffers.

3. A method for optimizing a delivery of information content from a base station to a plurality of mobile platforms via a space-based communication link, each of said mobile platforms including a network, said method comprising the steps of:

requesting said information content through one said network disposed on one said mobile platform;

packaging said information content requested by each said mobile platform as a plurality of information packets each being tagged with an identifier identifying which said mobile platform is to receive each one of said packets;

feeding said information packets into a router having a plurality of buffers;

monitoring said buffers to determine if any one of said buffers has more available capacity than other ones of said buffers and;

selecting a transmission scheme, based on the detection of available capacity of a given one of said buffers and an input applied remotely to said mobile platform, to increase a utilization of said given one of said buffers having available capacity, and to ensure that said information content is transmitted to said given one buffer using a transmission protocol which is more likely to ensure that all of said information content is received by said mobile platform requesting same.

4. The method of claim 3, wherein identifying said information packets comprises identifying each said information packet with a time stamp tag.

5. The method of claim 3, further comprising using a point-to-point transmission protocol to transmit said information content when said given one of said buffers is detected to have additional capacity.

6. The method of claim 3, further comprising using a multicast transmission protocol to transmit said information content when said given one of said buffers is detected to not have additional capacity.

7. A communication method for maximizing an efficiency of the delivery of information content to a mobile platform from a base station, via a space-based transponder, said method comprising:

having a user on said mobile platform request specific information content from a content source associated with said base station via a network disposed on said mobile platform;

transmitting said specific information content from said content source to a router based on an input applied remotely to said mobile platform;

using said router to prepare said specific information content in a plurality of data packets and to route said data packets to one of a plurality of buffers;

using said base station to monitor a utilization of said one buffer;

detecting when said one buffer has available capacity and is therefore not being fully utilized and;

when said one buffer is not being fully utilized, using said ground station to select a transmission protocol that will require additional capacity of said one buffer to better ensure that all of said data packets are received by said mobile platform requesting said data packets.

8. The method of claim 7, further comprising selecting a point-to-point transmission scheme for said data packets in the event said one buffer is detected to have additional capacity.

9. The method of claim 7, further comprising selecting a multicast transmission scheme for said data packets in the event said buffer is detected to not have additional capacity.

10. A method for optimizing a delivery of information content from a base station to users connected to a network disposed on each of a plurality of mobile platforms via a space-based communication link, said method comprising:

requesting said information content by said users through said network disposed on each of said mobile platforms;

packaging said information content requested by each said mobile platform as a plurality of information packets each being tagged with an identifier identifying which said mobile platform is to receive each one of said packets;

feeding said information packets into a router having a plurality of buffers;

monitoring said buffers to determine if any one of said buffers has more available capacity than other ones of said buffers;

selecting a transmission scheme, based on the detection of available capacity of a given one of said buffers and on input from an operator external to said mobile platform, to increase a utilization of said given one of said buffers having available capacity, and to ensure that said information content is transmitted to said given one buffer using a transmission protocol which is more likely to ensure that all of said information content is received by said mobile platform requesting same; and transmitting said information content to at least one user on said mobile platform.

11. The method of claim 10, wherein said operation of identifying said information packets comprises identifying each said information packet with a time stamp tag.

12. The method of claim 10, further comprising using a point-to-point transmission protocol to transmit said information content when said given one of said buffers is detected to have additional capacity.

13. The method of claim 10, further comprising using a multicast transmission protocol to transmit said information content when said given one of said buffers is detected to not have additional capacity.

\* \* \* \* \*